US009847830B2

(12) United States Patent
Maiya et al.

(10) Patent No.: US 9,847,830 B2
(45) Date of Patent: Dec. 19, 2017

(54) TECHNIQUES FOR PRUNING FALSE PEAKS DURING SLOT SYNCHRONIZATION AT A USER EQUIPMENT

(71) Applicant: QUALCOMM Incorporated, San Diego, CA (US)

(72) Inventors: Shashank Maiya, Sunnyvale, CA (US); Yi Su, San Jose, CA (US); Harish Venkatachari, Sunnyvale, CA (US); Nate Chizgi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/997,400

(22) Filed: Jan. 15, 2016

(65) Prior Publication Data

US 2016/0315694 A1    Oct. 27, 2016

Related U.S. Application Data

(60) Provisional application No. 62/151,868, filed on Apr. 23, 2015.

(51) Int. Cl.
*H04B 7/26* (2006.01)
*H04W 56/00* (2009.01)
(Continued)

(52) U.S. Cl.
CPC ....... *H04B 7/2681* (2013.01); *H04B 1/70755* (2013.01); *H04J 11/0073* (2013.01);
(Continued)

(58) Field of Classification Search
CPC .............. H04B 7/2681; H04B 1/70755; H04L 27/2675; H04L 27/2655; H04J 11/0073; H04W 56/005
See application file for complete search history.

(56) References Cited

U.S. PATENT DOCUMENTS

2006/0140314 A1    6/2006  Kim et al.
2009/0180522 A1*   7/2009  Sesia ................. H04B 1/7115
                                                  375/148
(Continued)

FOREIGN PATENT DOCUMENTS

EP         2328286 A1    6/2011
WO    WO-2007/001288 A1  1/2007

OTHER PUBLICATIONS

International Search Report and Written Opinion—PCT/US2016/024169—ISA/EPO—dated Jun. 24, 2016 10 Total Pages.

*Primary Examiner* — Mohammad Anwar
(74) *Attorney, Agent, or Firm* — Arent Fox LLP

(57) ABSTRACT

The present disclosure describes a method and an apparatus for pruning false peaks during slot synchronization at a user equipment (UE). For example, a method is provided to identify a plurality of first peaks associated with a primary-synchronization channel (P-SCH) received at the UE and a plurality of second peaks from the plurality of first peaks. Further, one or more pruning locations along with associated energy thresholds for each of the plurality of the second peaks may be determined and whether a peak of the plurality of the first peaks is a false peak is identified based on whether the peak is located at one of the one or more pruning locations of the peak and an associated energy value of the peak does not satisfy the associated energy threshold of the pruning location. Furthermore, the peak identified as the false peak is discarded.

24 Claims, 8 Drawing Sheets

(51) Int. Cl.
*H04B 1/7075* (2011.01)
*H04J 11/00* (2006.01)
*H04L 27/26* (2006.01)

(52) U.S. Cl.
CPC ...... *H04L 27/2655* (2013.01); *H04L 27/2675* (2013.01); *H04W 56/005* (2013.01)

(56) References Cited

U.S. PATENT DOCUMENTS

2012/0307820 A1* 12/2012 Tomatis ............. H04B 1/70755
 370/350
2014/0125400 A1* 5/2014 Borowski ............ H04J 11/0073
 327/336

* cited by examiner

TECHNIQUES FOR PRUNING FALSE PEAKS DURING SLOT SYNCHRONIZATION AT A USER EQUIPMENT

CLAIM OF PRIORITY

The present application for patent claims priority to U.S. Provisional Patent Application No. 62/151,868, filed Apr. 23, 2015, entitled "Peak Pruning in a Wideband Code Division Multiple Access (W-CDMA) System," which is assigned to the assignee hereof, and hereby expressly incorporated by reference herein.

BACKGROUND

The present disclosure relates generally to communication systems, and more particularly, to performance of a user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, in a W-CDMA system, the first step (Step 1) of cell search may involve energy accumulation over multiple slots of a radio frame and return the strongest "N" peaks above a certain threshold. A peak may refer to a relatively high energy indication and the energy threshold may be selected to reduce target false alarm rate. Although, some of the strongest "N" peaks may exceed the threshold, they may not correspond to a correct slot timing of a cell. These peaks that do not correspond to the correct slot timing of the cell may be referred to as "false" peaks. The false peaks may trigger subsequent searcher tasks (e.g., frame synchronization or Step 2 of cell search) and may consume significant battery power of the UE.

Thus, there is a desire for a method and an apparatus for pruning false peaks during slot synchronization at a UE

SUMMARY

Figure 1:
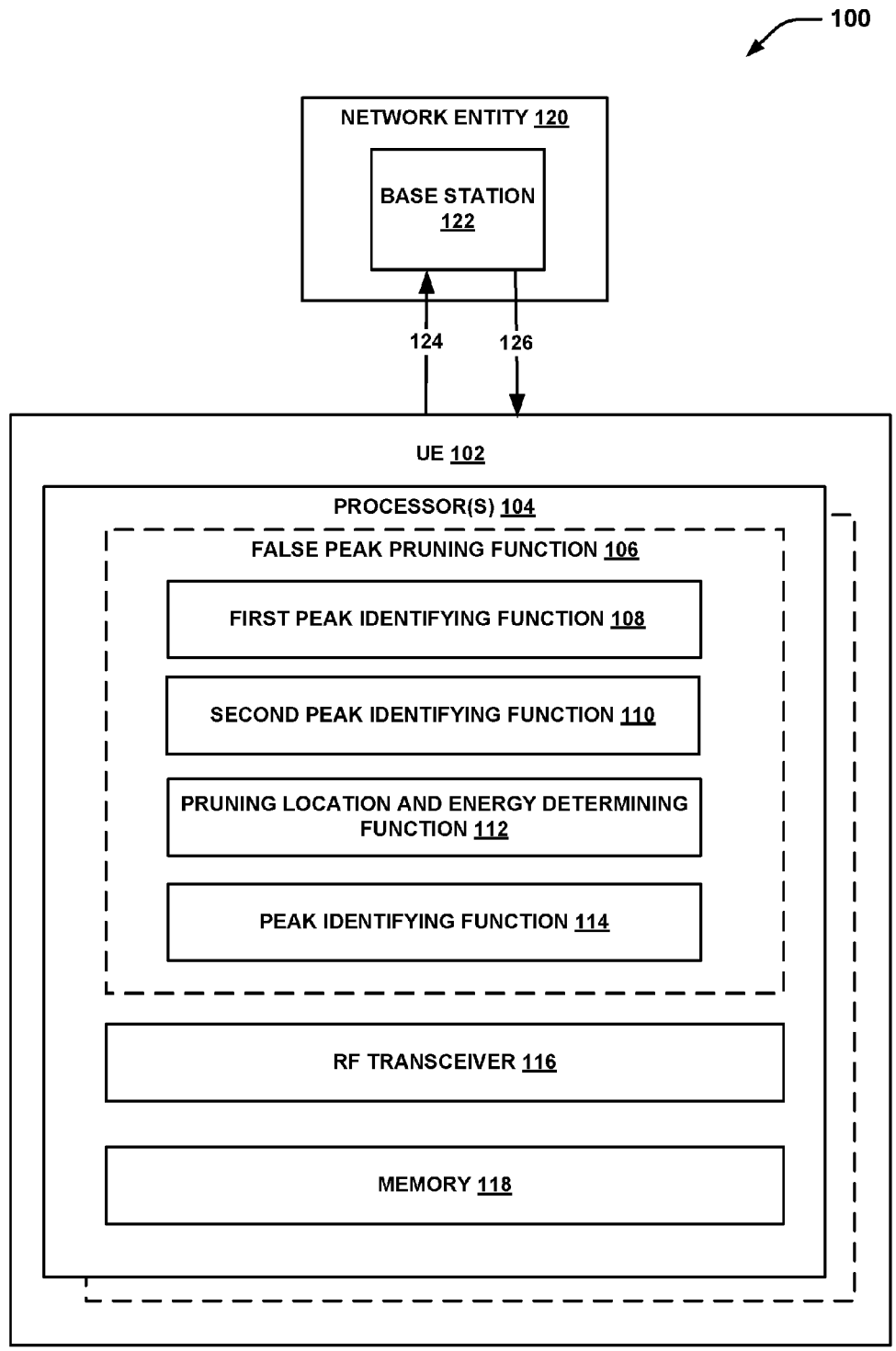
FIG. 1 is a schematic diagram of a wireless communications system including a user equipment having an aspect of a false peak pruning function for pruning false peaks during slot synchronization at a user equipment.

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for pruning false peaks during slot synchronization at a UE. For example, the present disclosure presents an example method for pruning false peaks during slot synchronization at a UE which may include identifying a plurality of first peaks associated with a primary-synchronization channel (P-SCH) received at the UE, wherein a peak is identified as a first peak based on whether an energy value of the peak satisfies a first threshold value; identifying a plurality of second peaks from the plurality of first peaks, wherein a peak of the plurality of first peaks is identified as a second peak based on whether an energy value of the peak of the plurality of first peaks satisfies a second threshold value; determining one or more pruning locations and associated energy thresholds for each of the plurality of the second peaks; identifying whether a peak of the plurality of first peaks not identified as the second peak is a false peak based on whether the peak of the plurality of the first peaks is located at one of the one or more pruning locations of the peak and an associated energy value of the peak does not satisfy the associated energy threshold of the pruning location; discarding the peak identified as the false peak.

Further, the present disclosure provides an apparatus for pruning false peaks during slot synchronization at a UE which may include means for identifying a plurality of first peaks associated with a primary-synchronization channel (P-SCH) received at the UE, wherein a peak is identified as a first peak based on whether an energy value of the peak satisfies a first threshold value; means for identifying a plurality of second peaks from the plurality of first peaks, wherein a peak of the plurality of first peaks is identified as a second peak based on whether an energy value of the peak of the plurality of first peaks satisfies a second threshold value; means for determining one or more pruning locations along with associated energy thresholds for each of the plurality of the second peaks; means for identifying whether a peak of the plurality of the second peaks is a false peak based on whether the peak of the plurality of the second peaks is located at one of the one or more pruning locations of the peak and an energy value of the peak of the plurality of the second peaks does not satisfy the associated energy threshold of the pruning location of the one or more pruning locations of the peak; and means for discarding the peak identified as the false peak.

Furthermore, the present disclosure provides a non-transitory computer readable medium storing computer executable code for pruning false peaks during slot synchronization at a UE which may include code for identifying a plurality of first peaks associated with a primary-synchronization channel (P-SCH) received at the UE, wherein a peak is identified as a first peak based on whether an energy value of the peak satisfies a first threshold value; code for identifying a plurality of second peaks from the plurality of first peaks, wherein a peak of the plurality of first peaks is identified as a second peak based on whether an energy value of the peak of the plurality of first peaks satisfies a second threshold value; code for determining one or more pruning locations along with associated energy thresholds for each of the plurality of the second peaks; code for identifying whether a peak of the plurality of the second peaks is a false peak based on whether the peak of the plurality of the second peaks is located at one of the one or more pruning locations of the peak and an energy value of the peak of the plurality of the second peaks does not satisfy the associated energy threshold of the pruning location of the one or more pruning locations of the peak; and code for discarding the peak identified as the false peak.

Additionally, the present disclosure provides an apparatus for pruning false peaks during slot synchronization which may include a memory configured to store data; and one or more processors communicatively coupled with the memory, wherein the one or more processors and the memory are configured to identify a plurality of first peaks associated with a primary-synchronization channel (P-SCH) received at a user equipment (UE), wherein a peak is identified as a first peak based on whether an energy value of the peak satisfies a first threshold value; identify a plurality of second peaks from the plurality of first peaks, wherein a peak of the plurality of first peaks is identified as a second peak based on whether an energy value of the peak of the plurality of first peaks satisfies a second threshold value; determine one or more pruning locations along with associated energy thresholds for each of the plurality of the second peaks; identify whether a peak of the plurality of the second peaks is a false peak based on whether the peak of the plurality of the second peaks is located at one of the one or more pruning locations of the peak and an energy value of the peak of the plurality of the second peaks does not satisfy the associated energy threshold of the pruning location of the one or more pruning locations of the peak; and discard the peak identified as the false peak.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method and an apparatus for pruning false peaks during slot synchronization at a user equipment. The method and apparatus may include identifying a plurality of first peaks associated with a primary-synchronization channel (P-SCH) received at the UE, wherein a peak is identified as a first peak based on whether an energy value of the peak satisfies a first threshold value; identifying a plurality of second peaks from the plurality of first peaks, wherein a peak of the plurality of first peaks is identified as a second peak based on whether an energy value of the peak of the plurality of first peaks satisfies a second threshold value; determining one or more pruning locations and associated energy thresholds for each of the plurality of the second peaks; identifying whether a peak of the plurality of first peaks not identified as the second peak is a false peak based on whether the peak of the plurality of the first peaks is located at one of the one or more pruning locations of the peak and an associated energy value of the peak does not satisfy the associated energy threshold of the pruning location; and discarding the peak identified as the false peak.

Referring to FIG. 1, in an aspect, a wireless communication system 100 includes a user equipment (UE) 102 in communication with a network entity 120 and/or base station 122, one or more processors 104, and a false peak pruning function 106 running on processor 104 (or processors 104 in a distributed computing environment) for pruning false peaks during slot synchronization at a user equipment (UE). In an aspect, false peak pruning function 106 may include a first peak identifying function 108, a second peak identifying function 110, a pruning location and energy determining function 112, and/or a peak identifying function 114.

UE 102 may communicate with network entity 120 which may include one or more base stations 122 via one or more over-the-air links, e.g., an uplink (UL) 124 and/or a downlink (DL) 126. In an aspect, UL 124 is generally used for communication from UE 102 to network entity 120 and/or base station 122 and DL 126 is generally used for communication from network entity 120 and/or base station 122 to UE 102. In an additional aspect, network entity 120 may include a radio network controller (RNC) and/or mobile management entity (MME), not shown in FIG. 1.

In an aspect, network entity 120 may include, but not limited to, an access point, a base station (BS) or Node B or eNodeB, a macro cell, a small cell (e.g., a femtocell, or a pico cell), a relay, a peer-to-peer device, an authentication, authorization and accounting (AAA) server, a mobile switching center (MSC), Mobility Management Entity (MME), SON management server, OAM server, Home NodeB Management System (HMS), Home eNodeB Management System (HeMS), etc. Additionally, network entity 120 may include one or more of any type of network components that can enable base station 122 communicate and/or establish and maintain links 124 and/or 126 with UE 102. In an example aspect, base station 122 may operate according to Wideband Code Division Multiple Access (W-CDMA), Code Division Multiple Access (CDMA), Time Division Synchronous Code Division Multiple Access (TD-SCDMA), Long Term Evolution (LTE), or Global System for Mobile Communications (GSM) standard as defined in 3GPP Specifications.

In an aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, when a UE is powered ON (e.g., turned ON), the UE may scan for a cell (e.g., search for a cell). The UE performing the scanning by searching for frequencies that may have been configured at the UE, for example, by the network operator. The scanning for frequencies (or cell search) is based on, for example, in UMTS, three downlink channels transmitted by a base station. For example, in UMTS RAT, the three downlink channels transmitted by a base station which used during cell search by a UE are a primary synchronization channel (P-SCH), a secondary synchronization channel (S-SCH), and a common pilot channel (CPICH). The P-SCH and the S-SCH channels are referred as the Synchronization channels.

In UMTS, the cell search procedure generally includes three steps: First Step—Slot synchronization, Second Step—Frame synchronization, and Third Step—Scrambling code identification. For instance, in a UMTS radio frame, each radio frame is 15 ms long and divided into 15 time slots (TS) with each time slot equal to 2560 chips for a total of 38,400 chips. During the first Step of the cell search procedure (e.g., slot synchronization), once the UE is powered, the UE searches for a P-SCH. The P-SCH is defined by a burst of 256 chips which is transmitted in the first 10% of every time slot (TS). That is, the burst is transmitted after every 0.67 ms. During slot synchronization, the same code is used by all the cells and enables the UEs to detect the existence of a UMTS cell and to synchronize the UE on the time slot boundaries. This is generally done with a single matched filter or any similar device. In an aspect, the slot timing of the cell is obtained by detecting (or identifying) "peaks" in the matched filter output.

Once the slot synchronization procedure is complete, the UE performs frame synchronization (second Step) at the UE to synchronize the frame boundary. The frame synchronization is performed using the S-SCH. After the frame synchronization is complete, the scrambling code, which generally includes a sequence of bits, may be determined by decoding the common pilot channel (CPICH) which is a physical control channel broadcasted over the entire cell. However, the second and third steps of the cell search procedure are energy consuming (e.g., consume battery power of the UE) as the "peaks" identified during Step 1 of the cell search are used for further searching during the second and third steps of the cell search procedure. Thus, the occurrence of false detections (e.g., false detection of peaks by the UE) by the UE during the first Step of the cell search procedure impacts the battery life of the UE and/or the performance of the UE.

In an aspect, false peak pruning function 106 may be configured to transmit/receive messages to/from network entity 120 via one or more radio frequency (RF) transceiver (s) 116. For example, false peak pruning function 106 may include and execute communication protocols and/or manage other standards-specific communication procedures using protocols and/or standards-specific instructions and/or subscription-specific configuration information that allow communications with network entity 120 and/or UE 102. Further, RF transceiver 116 may be configured to transmit and/or receive the communication exchange signaling to and/or from one or more base stations 122 or other devices in wireless communication system 100. For example, RF transceiver 116 may include, but is not limited to, one or more of a transmitter, a receiver, a transceiver, protocol stacks, transmit chain components, and/or receive chain components. Additionally, UE 102 may include memory 118.

In an aspect, UE 102 may include false peak pruning function 106 for pruning false peaks during slot synchronization at a UE by identifying a plurality of first peaks associated with a primary-synchronization channel (P-SCH) received at the UE, wherein a peak is identified as a first peak based on whether an energy value of the peak satisfies a first threshold value; identifying a plurality of second peaks from the plurality of first peaks, wherein a peak of the plurality of first peaks is identified as a second peak based on whether an energy value of the peak of the plurality of first peaks satisfies a second threshold value; determining one or more pruning locations along with associated energy thresholds for each of the plurality of the second peaks; identifying whether a peak of the plurality of the second peaks is a false peak based on whether the peak of the plurality of the second peaks is located at one of the one or more pruning locations of the peak and an energy value of the peak of the plurality of the second peaks does not satisfy the associated energy threshold of the pruning location of the one or more pruning locations of the peak; and discarding the peak identified as the false peak.

Figure 2:
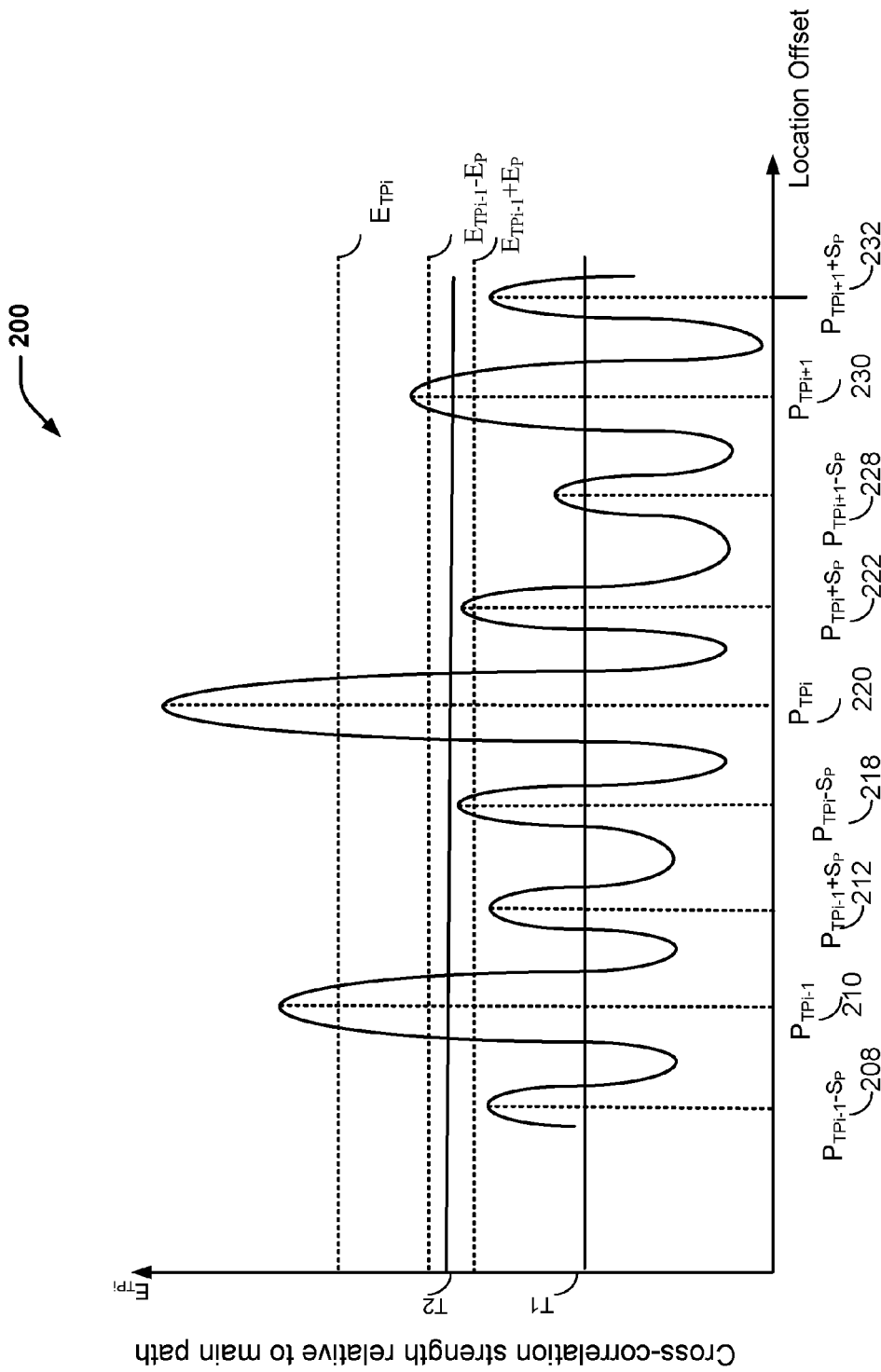
FIG. 2 illustrates an example aspect of peak identification during slot synchronization at a user equipment.

FIG. 2 illustrates an example of peak identification during slot synchronization at a UE.

For example, FIG. 2 illustrates an example plot of cross-correlation between a P-SCH sequence and W-CDMA signals received at UE 102. The cross-correlation may be performed with all 512 primary scrambling codes (PSC) relative to a main path (e.g., a path where the transmitted signals mostly includes P-SCH, S-SCH, P-CPICH, and P-CCPCH) in a clean channel with one path and very high geometry.

For instance, in an aspect, UE 102, RF transceiver 116, and/or false peak pruning function 106 may compute energy accumulation over multiple slots and compare the computed energies with a threshold (e.g., a first threshold, "T1"). Based on the comparison, UE 102, RF transceiver 116, and/or false peak pruning function 106 may identify a plurality of peaks, referred to as "plurality of first peaks"

based on whether a peak satisfies (e.g., is above) the T1 threshold. For example, in aspect, peaks at locations $P_{TPi-1}-S_P$ (208), $P_{TPi-1}$ (210), $P_{TPi-1}+S_P$ (212), $P_{TPi}-S_P$ (218), $P_{TPi}$ (220), $P_{TPi}+S_P$ (222), $P_{TPi+1}-S_P$ (228), $P_{TPi+1}$ (230), and/or $P_{TPi+1}+S_P$ (232) may be identified as the plurality of first peaks as they satisfy the first threshold. SP refers to an offset relative to the main path.

Further, UE 102, RF transceiver 116, and/or false peak pruning function 106 may identify another plurality of peaks, referred to as a "plurality of second peaks," from the plurality of first peaks based on whether a peak of plurality of first peaks (that is, of peaks 208, 210, 212, 218, 220, 222, 318, 320, and 322) satisfies (e.g., is above) a second threshold, e.g., T2. In an aspect, T2 may be defined as a ratio of a pilot signal power (Ec) to total power (Io) received (Eclo) of a peak. For example, in an aspect, peaks at locations $P_{TPi-1}$ (210), $P_{TPi}$ (220), and/or $P_{TPi+1}$ (230) may be identified as the plurality of second peaks. In an aspect, the plurality of second peaks may be used to determine which of the remaining first peaks (that is, peaks 208, 212, 218, 222, 228, and 232) to prune (e.g., discard). That is, the plurality second peaks (e.g., peaks 210, 220, and 230) are used to determine which of the remaining first peaks are to be discarded by the UE and not used during Step 2 of the cell search procedure.

Furthermore, RF transceiver 116, and/or false peak pruning function 106 may determine one or more pruning locations and associated energy thresholds for each of the second peaks. For example, false peak pruning function 106 may determine $P_{TPi-1}-S_P$ (208) and $P_{TPi-1}+S_P$ (212) as pruning locations for second peak located at $P_{TPi-1}$ (210) along with an associated energy threshold of $E_{TPi-1}-E_P$. Additionally, false peak pruning function 106 may determine $P_{TPi}-S_P$ (218) and $P_{TPi}+S_P$ (222) as pruning locations for second peak located at $P_{TPi}$ (220) along with an associated energy threshold of $E_{TPi}$ and $P_{TPi+1}-S_P$ (228) and $P_{TP+1}+S_P$ (232) as pruning locations for second peak located at $P_{TPi+1}$ (230) along with an associated energy threshold of $E_{TPi+1}-E_P$.

In an aspect, for instance, peaks located at $P_{TPi-1}-S_P$ (208) and $P_{TPi-1}+S_P$ (212) may be identified as false peaks as they are located at identified pruning locations (e.g., 208 and 212) of a second peak located at $P_{TPi-1}$ (210) and with energy values below the associated threshold value of $E_{TPi-1}-E_P$. Additionally, in an aspect, for instance, peaks located at $P_{TPi}-S_P$ (218) and $P_{TPi}+S_P$ (222) may be identified as false peaks as they are located at identified pruning locations (e.g., 218 and 222) of a second peak located at $P_{TPi}$ (220) and with energy values below the associated threshold value of $E_{TPi}-E_P$. Moreover, in an additional aspect, for instance, peaks located at $P_{TPi+1}-S_P$ (228) and $P_{TPi+1}+S_P$ (232) may be identified as false peaks as they are located at identified pruning locations (e.g., 228 and 232) of a second peak located at $P_{TPi+1}$ (230) and with energy values below the associated threshold value of $E_{TPi+1}-E_P$.

Figure 3:
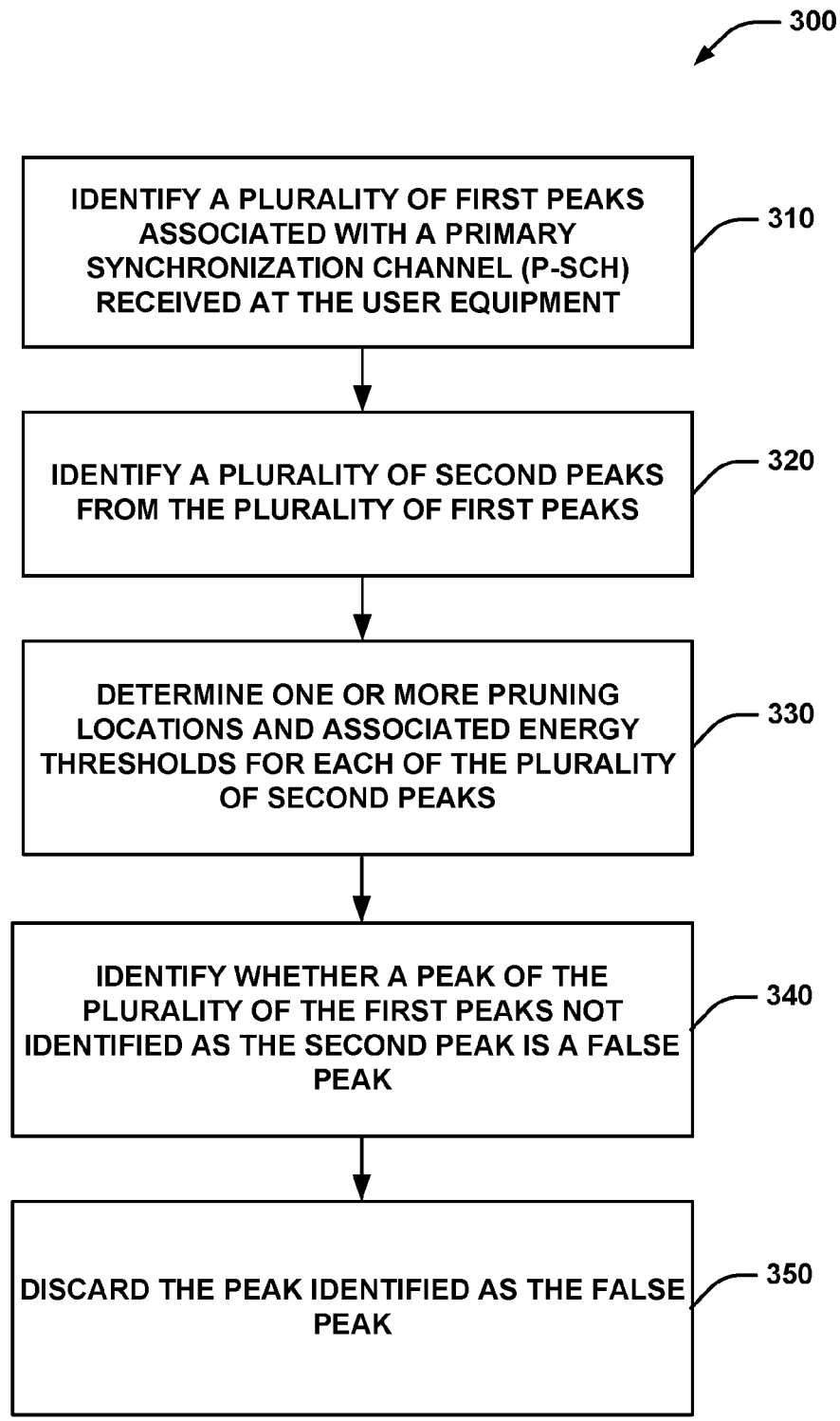
FIG. 3 illustrates an example methodology for pruning false peaks during slot synchronization at a user equipment in an aspect of the present disclosure.

FIG. 3 illustrates a flow chart illustrating an example methodology 300 for pruning false peaks during slot synchronization at a UE.

In an aspect, at block 310, methodology 300 may include identifying a plurality of first peaks associated with a primary-synchronization channel (P-SCH) received at the UE, wherein a peak is identified as a first peak based on whether an energy value of the peak satisfies a first threshold value. For example, in an aspect, UE 102, RF transceiver 116, and/or false peak pruning function 106 may include a specially programmed processor module, or a processor executing specially programmed code stored in a memory, to identify a plurality of first peaks (e.g., at locations represented by 208, 210, 212, 218, 220, 222, 228, 230, and/or 232) associated with a primary-synchronization channel (P-SCH) received at the UE (e.g., P-SCH received over or as a part of DL 126), wherein a peak is identified as a first peak based on whether an energy value of the peak satisfies a first threshold value. In an aspect, false peak pruning function 106 may include a first peak identifying function 108 to perform this functionality.

For instance, in an aspect, RF transceiver 116 and/or false peak pruning function 106 may measure energy accumulation over multiple slots of the P-SCH to identify peaks and compare the measured energies of the peaks with a threshold (e.g., a first threshold, T1 of FIG. 2). For example, in an aspect, RF transceiver 116 and/or false peak pruning function 106 may search for the slot timing by correlating a P-SCH sequence with received signal with a using a matched filter (MF) whose tap coefficient is matched to the P-SCH sequence. As the signal-to-noise power ratio (SNR) of the transmitted P-SCH code is very low, correlation values from multiple slots may be combined to properly acquire the slot timing.

In an aspect, false peak pruning function 106 may identify a peak as a first peak when the energy value of the peak is above (e.g., satisfies) the threshold (e.g., T1). For example, peaks located at $P_{TPi-1}-S_P$ (208), $P_{TPi-1}$ (210), $P_{TPi-1}+S_P$ (212), $P_{TPi}-S_P$ (218), $P_{TP}i$ (220), $P_{TPi}+S_P$ (222), PTPi+1$-S_P$ (228), $P_{TPi}+1$ (230), and/or $P_{TPi+1}+S_P$ (232) may be identified as first peaks as they satisfy the first threshold. As mentioned above, the first threshold may be selected to meet certain design criteria, for example, in an aspect, a false peak alarm rate in an additive white gaussian notice (AWGN) scenario in the absence of any P-SCH transmission.

In an aspect, at block 320, methodology 300 may include identifying a plurality of second peaks from the plurality of first peaks, wherein a peak of the plurality of first peaks is identified as a second peak based on whether an energy value of the peak of the plurality of first peaks satisfies a second threshold value. For example, in an aspect, UE 102, RF transceiver 116, and/or false peak pruning function 106 may include a specially programmed processor module, or a processor executing specially programmed code stored in a memory, to identify a plurality of second peaks (e.g., at locations represented by 210, 220, 230) from the plurality of first peaks. A peak (e.g., from the plurality of first peaks) may be identified as a second peak based on whether an energy value of the peak satisfies (e.g., greater or higher) a second threshold value. In an aspect, false peak pruning function 106 may include a second peak identifying function 110 to perform this functionality.

For instance, a peak (e.g., of the plurality of first peaks) may be identified as a second peak based at least on whether a ratio of a pilot signal power (Ec) to total power (Io) received (Eclo) of the peak of is above a second threshold value, T2. That is, Eclo>T2. For example, in an aspect, RF transceiver 116 and/or false peak pruning function 106 may identify "n" peaks as second peaks from the plurality of first peaks. That is, "n" number of peaks have Eclo>T2. In an aspect, T2 may be selected (or configured) to meet certain design criteria. Additionally, the "n" peaks (i.e., the plurality of second peaks) may be located at $P_{TP-1}$, $P_{TPi}$, and $P_{TPi}$, as shown in FIG. 2 with Eclo values of $E_{TPi-1}$, $E_{TPi}$, and $E_{TPi+1}$, respectively. In an additional or optional aspect, the remaining of the plurality first peaks (that is, remaining peaks of the plurality of first peaks not identified as second peaks) may be pruned with respect to (e.g., relative to) the "n" peaks or the plurality of second peaks.

In an aspect, at block 330, methodology 300 may include determining one or more pruning locations along with associated energy thresholds for each of the plurality of the second peaks. For example, in an aspect, UE 102, RF transceiver 116, and/or false peak pruning function 106 may include a specially programmed processor module, or a processor executing specially programmed code stored in a memory, to determine one or more pruning locations (e.g., locations represented by 208, 212, 218, 222, 228, and/or 230) along with associated energy thresholds ($E_{TPi-1}-E_P$, $E_{TPi}-E_P$, and/or $E_{TPi+1}-E_P$) for each of the second peaks (i.e., locations represented by 210, 220, and/or 230). In an aspect, false peak pruning function 106 may include a pruning location and energy determining function 112 to perform this functionality.

For instance, in an aspect, RF transceiver 116 and/or false peak pruning function 106 may determine pruning locations for each of the "N" peaks identified at block 320. In an aspect, for example, the pruning locations may be determined based on auto-correlation of P-SCH and/or cross-correlation of P-SCH and S-SCH and may be located at, for example, $S_{p,\,cx1}$=+/−{2, 6, 7, 9, 15, 17, 31, 32, 33, 47, 49, 63, 65, 79, 81, 95, 96, 97, 111, 112, 113, 160, 176, 224} cx1 offset positions with respect to each of "n" peaks or the second peaks. There is a high possibility (e.g., probability) of finding pruning locations at these offsets locations (e.g., relative to the main paths or "n" second peaks) based at least on the correlations. Additionally, false peak pruning function 106 may also measure or determine the associated energies for each of the pruning locations of each of the second peaks. In an aspect, energy of a pruning location may be defined by $E_{prune,\,i}=E_{TPi}-E_p$. For instance, energy of a pruning location $P_{TPi-1}-S_P$ (208) may be represented by $E_{TPi-1}-E_P$.

In an additional or optional aspect, if a same pruning location exists for two or more of the second peaks, the energy threshold for the pruning locations may be any function of the two energy thresholds. That is, for example, if $P_{TPi-1}+S_P$ and $P_{TPi}-S_P$ overlap, the energy threshold for these two locations may be any function of $E_{TPi-1}-E_P$ and/or $E_{TPi}-E_P$.

In an aspect, at block 340, methodology 300 may include identifying whether a peak of the plurality of first peaks not identified as the second peak is a false peak based on whether the peak of the plurality of the first peaks is located at one of the one or more pruning locations of the peak and an associated energy value of the peak does not satisfy the associated energy threshold of the pruning location. For example, in an aspect, UE 102, RF transceiver 116, and/or false peak pruning function 106 may include a specially programmed processor module, or a processor executing specially programmed code stored in a memory, to identify whether a peak of the plurality of first peaks not identified as the second peak (e.g., peaks located at 208, 212, 218, 222, 228 and/or 232) is a false peak based on whether the peak of the plurality of the first peaks (e.g., one of peaks located at 208, 212, 218, 222, 228 and/or 232) is located at one of the one or more pruning locations of the peak (e.g., locations 208 or 212 for second peak located at 210) and an associated energy value of the peak does not satisfy the associated energy threshold (e.g., $E_{TPi-1}-E_P$) of the pruning location (e.g., location 208 or 212). In an aspect, false peak pruning function 106 may include a peak identifying function 114 to perform this functionality.

In an aspect, at block 350, methodology 300 may include discarding the peak identified as the false peak. For example, in an aspect, UE 102, RF transceiver 116, and/or false peak pruning function 106 may include a specially programmed processor module, or a processor executing specially programmed code stored in a memory, to discard the peak identified as the false peak. That is the peak (e.g., peaks located 208, 210, etc.) identified as a false peak is discarded and no further processing is performed by the UE. In other words, the peak is not passed on to Step 2 of cell search as defined above in reference to UMTS cell search procedure.

In an additional or optional aspect, UE 102, RF transceiver 116, and/or false peak pruning function 106 may prune Step 1 peaks (e.g., peaks identified as true peaks, at locations 210, 220, 230) which may correspond to cells whose timing is already known to the UE from the Step 1 results considered for further Step 2/3 processing. However, to ensure the UE does not miss any new cell which might have the exact same slot timing as the cell with known timing, a search for new cells in the timing known cell position may be performed once every 'm' Step 1 cycle.

For instance, in an aspect, UE 102, RF transceiver 116, and/or false peak pruning function 106 may keep track of the timing known cells, e.g., {PTK}. Then a Step 1 peak position is pruned if the Step 1 search peak position corresponds to one the Timing Known cells {PTK} and the path position has already been discovered and if the Step 1 position has not been pruned at least one of the previous 'm' Step 1 cycles.

As such, false peaks during slot synchronization at a UE may be identified to save batter power at the UE and/or to improve the performance of the UE.

Figure 4:
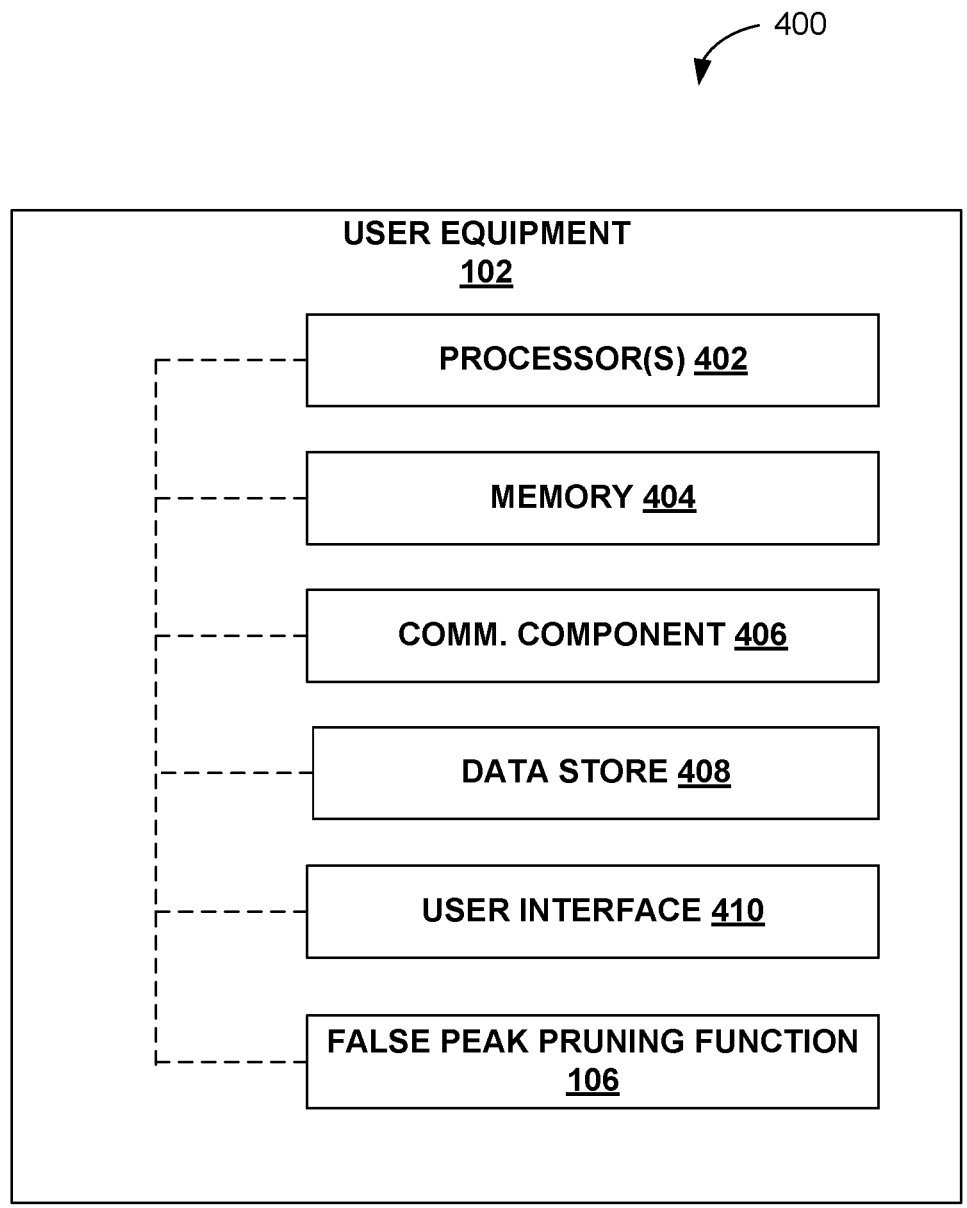
FIG. 4 is a block diagram illustrating an aspect of an example user equipment including a false peal pruning function according to the present disclosure.

Referring to FIG. 4, in an aspect, UE 102, for example, including false peak pruning function 106, may be or may include a specially programmed or configured computer device to perform the functions described herein. In one aspect of implementation, UE 102 may include false peak pruning function 106, first peak identifying function 108, second peak identifying function 110, pruning location and energy determining function 112, and/or peak identifying function 114, such as in specially programmed computer readable instructions or code, firmware, hardware, or some combination thereof.

In an aspect, for example as represented by the dashed lines, false peak pruning function 106 may be implemented in or executed using one or any combination of processor 402 (e.g., processor 104 of FIG. 1), memory 404, communications component 406, and data store 408. For example, false peak pruning function 106 may be executed on one or more processors 104. Further, for example, false peak pruning function 106 may be defined as a computer-readable medium stored in memory 404 and/or data store 408 and executed by processor 104. Moreover, for example, inputs and outputs relating to operations of false peak pruning function 106 may be provided or supported by communications component 406, which may provide a bus between the components of computer device 400 or an interface for communication with external devices or components.

UE 102 may include processor 104 specially configured to carry out processing functions associated with one or more of components and functions described herein. Processor 104 can include a single or multiple set of processors or multi-core processors. Moreover, processor 104 can be implemented as an integrated processing system and/or a distributed processing system.

User equipment 102 further includes memory 404, such as for storing data used herein and/or local versions of applications and/or instructions or code being executed by processor 104, such as to perform the respective functions of the respective entities described herein. Memory 404 can include any type of memory usable by a computer, such as random access memory (RAM), read only memory (ROM), tapes, magnetic discs, optical discs, volatile memory, non-volatile memory, and any combination thereof.

Further, user equipment 102 includes communications component 406 that provides for establishing and maintaining communications with one or more parties utilizing hardware, software, and services as described herein. Communications component 406 may carry communications between components on user equipment 102, as well as between user and external devices, such as devices located across a communications network and/or devices serially or locally connected to user equipment 102. For example, communications component 406 may include one or more buses, and may further include transmit chain components and receive chain components associated with a transmitter and receiver, respectively, or a transceiver, operable for interfacing with external devices.

Additionally, user equipment 102 may further include data store 408, which can be any suitable combination of hardware and/or software, that provides for mass storage of information, databases, and programs employed in connection with aspects described herein. For example, data store 408 may be a data repository for applications not currently being executed by processor 104.

User equipment 102 may additionally include a user interface component 410 operable to receive inputs from a user of user equipment 102, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 5:
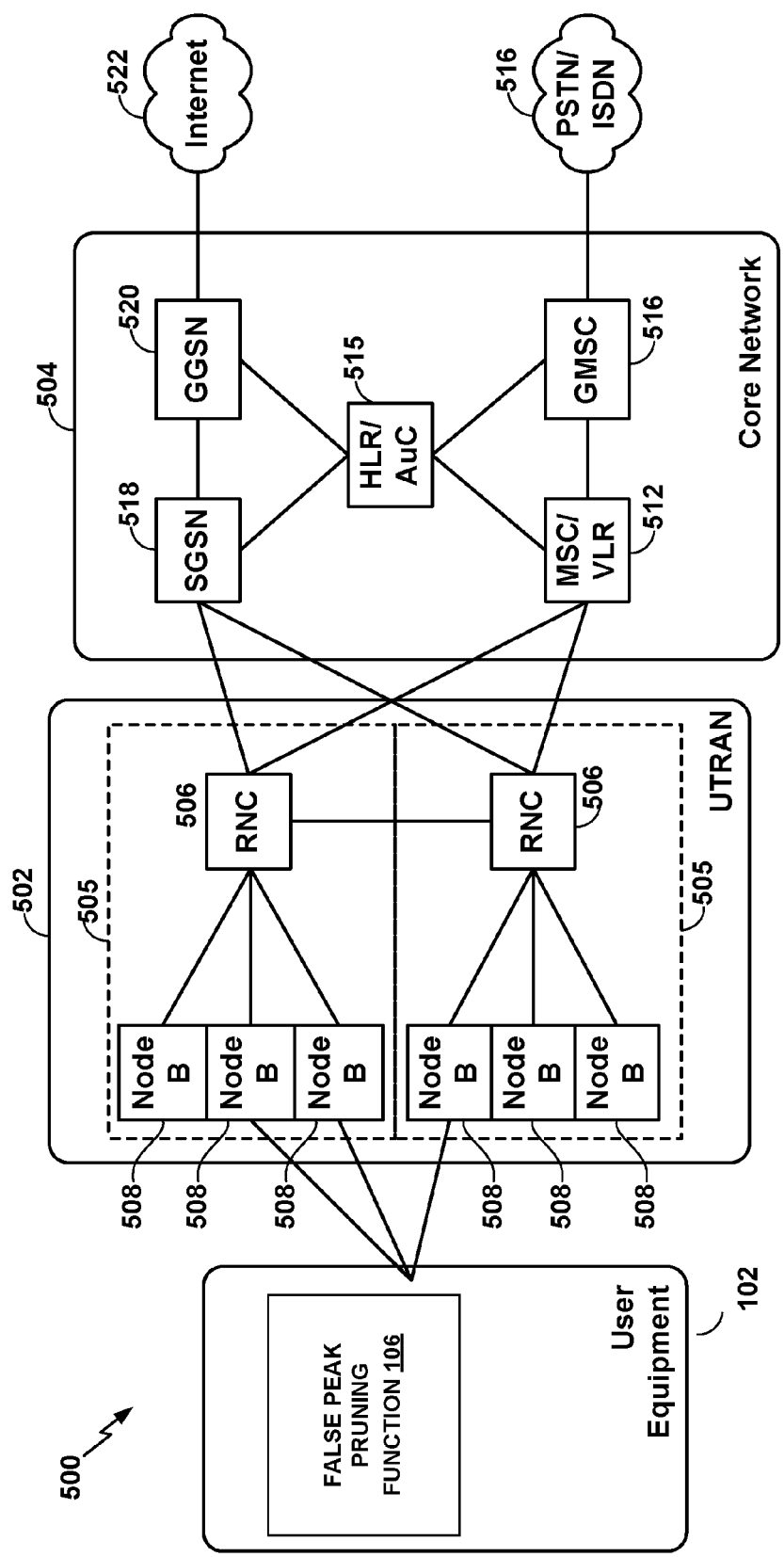
FIG. 5 is a block diagram conceptually illustrating an example of a telecommunications system including a user equipment with a false peak pruning function according to the present disclosure.

Referring to FIG. 5, by way of example and without limitation, the aspects of the present disclosure are presented with reference to a UMTS system 500 employing a W-CDMA air interface, and may include a UE 102 executing an aspect of false peak pruning function 106 of FIG. 1. A UMTS network includes three interacting domains: a Core Network (CN) 504, a UMTS Terrestrial Radio Access Network (UTRAN) 502, and UE 102. In an aspect, as noted, UE 102 (FIG. 1) may be configured to perform functions thereof, for example, including pruning false peaks during slot synchronization at the UE. Further, UTRAN 502 may comprise network entity 120 and/or base station 122 (FIG. 1), which in this case may be respective ones of the Node Bs 508. In this example, UTRAN 502 provides various wireless services including telephony, video, data, messaging, broadcasts, and/or other services. The UTRAN 502 may include a plurality of Radio Network Subsystems (RNSs) such as a RNS 505, each controlled by a respective Radio Network Controller (RNC) such as an RNC 506. Here, the UTRAN 502 may include any number of RNCs 506 and RNSs 505 in addition to the RNCs 506 and RNSs 505 illustrated herein. The RNC 506 is an apparatus responsible for, among other things, assigning, reconfiguring, and releasing radio resources within the RNS 505. The RNC 506 may be interconnected to other RNCs (not shown) in the UTRAN 502 through various types of interfaces such as a direct physical connection, a virtual network, or the like, using any suitable transport network.

Communication between UE 102 and Node B 508 may be considered as including a physical (PHY) layer (e.g., PHY 205) and a medium access control (MAC) layer. Further, communication between UE 102 and RNC 506 by way of a respective Node B 508 may be considered as including a radio resource control (RRC) layer (e.g., Layer 3). In the instant specification, the PHY layer may be considered layer 1; the MAC layer may be considered layer 2; and the RRC layer may be considered layer 3. Information herein below utilizes terminology introduced in the RRC Protocol Specification, 3GPP TS 55.331 v5.1.0, incorporated herein by reference.

The geographic region covered by the RNS 505 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 505; however, the RNSs 505 may include any number of wireless Node Bs. The Node Bs 508 provide wireless access points to a CN 504 for any number of mobile apparatuses, such as UE 102, and may be network entity 120 and/or base station 122 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For illustrative purposes, one UE 102 is shown in communication with a number of the Node Bs 508. The DL, also called the forward link, refers to the communication link from a Node B 508 to a UE 102 (e.g., link 124), and the UL, also called the reverse link, refers to the communication link from a UE 102 to a Node B 508 (e.g., link 126).

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 102 with packet-based network connectivity. Data packets may be transferred between the GGSN 520 and the UEs 102 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 505 and a UE 102. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 102 provides feedback to Node B 508 over the HS-DPCCH to indicate whether it correctly decoded a packet on the downlink.

HS-DPCCH further includes feedback signaling from the UE 102 to assist the Node B 508 in taking the right decision in terms of modulation and coding scheme and precoding weight selection, this feedback signaling including the CQI and PCI.

HSPA Evolved or HSPA+ is an evolution of the HSPA standard that includes MIMO and 54-QAM, enabling increased throughput and higher performance. That is, in an aspect of the disclosure, the Node B 505 and/or the UE 102 may have multiple antennas supporting MIMO technology. The use of MIMO technology enables the Node B 505 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data streams may be transmitted to a single UE 102 to increase the data rate or to multiple UEs 102 to increase the overall system capacity. This is achieved by spatially precoding each data stream and then transmitting each spatially precoded stream through a different transmit antenna on the downlink. The spatially precoded data streams arrive at the UE(s) 102 with different spatial signatures, which enables each of the UE(s) 102 to recover the one or more the data streams destined for that UE 102. On the uplink, each UE 102 may transmit one or more spatially precoded data streams, which enables Node B 505 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
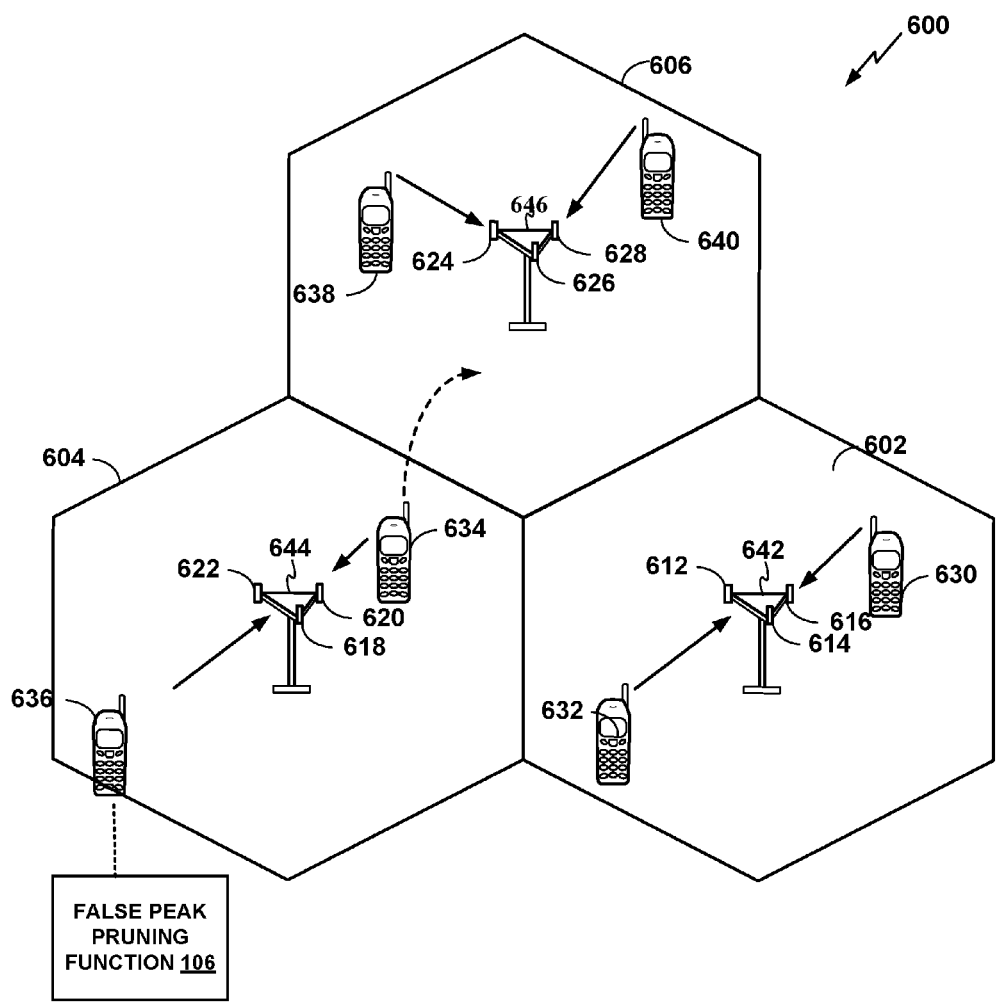
FIG. 6 is a conceptual diagram illustrating an example of an access network including a user equipment with a false peak pruning function according to the present disclosure.

Referring to FIG. 6, an access network 600 in a UTRAN architecture is illustrated, and may include one or more UEs 630, 632, 634, 636, 638, and 640, which may be the same as or similar to UE 102 (FIG. 1) in that they are configured to include false peak pruning function 106 (FIG. 1; for example, illustrated here as being associated with UE 636) for pruning false peaks during slot synchronization at the UE. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. UEs, for example, 630, 632, etc. may include several wireless communication devices, e.g., User Equipment or UEs, including false peak pruning function 106 of FIG. 1, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. Here, each Node B 642, 644, 646 is configured to provide an access point to a CN 504 (FIG. 5) for all the UEs 630, 632, 634, 636, 638, 640 in the respective cells 602, 604, and 606. Additionally, each Node B 642, 644, 646 may be base station 122 and/or and UEs 630, 632, 634, 636, 638, 640 may be UE 102 of FIG. 1 and may perform the methods outlined herein.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set). In any case, UE 634 may perform the reselection operations described herein.

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 1002.11 (Wi-Fi), IEEE 1002.16 (WiMAX), IEEE 1002.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
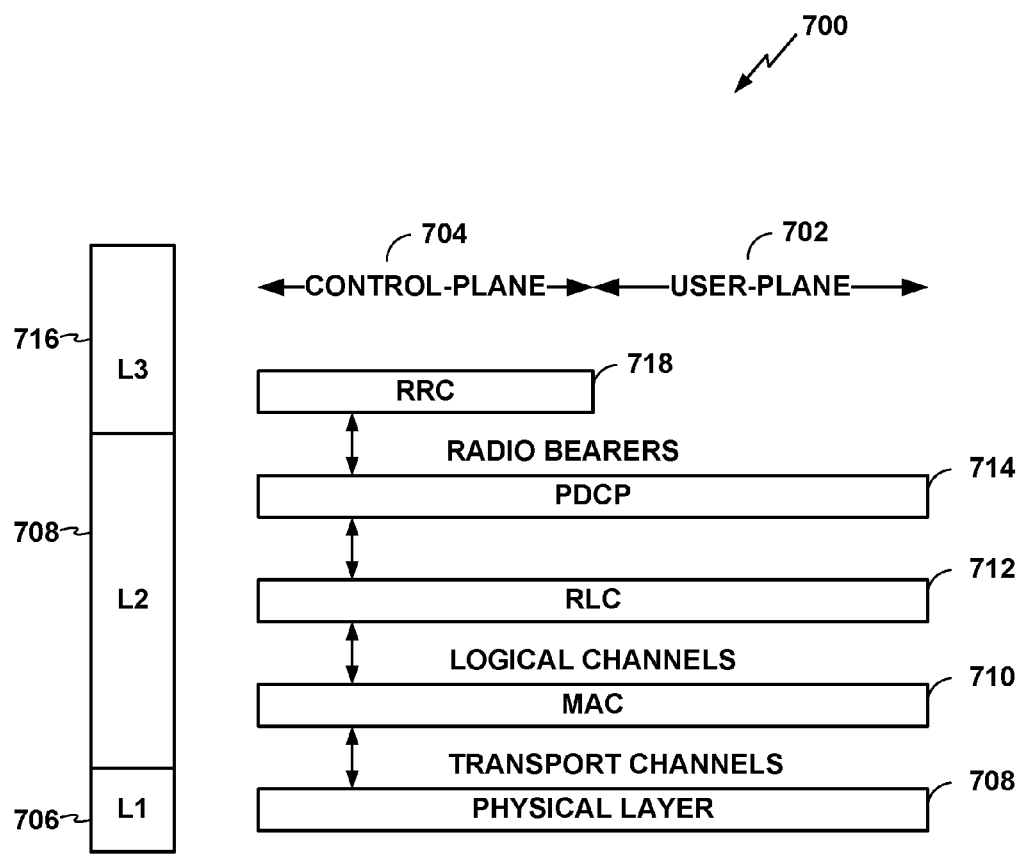
FIG. 7 is a conceptual diagram illustrating an example radio protocol architecture for the user and control plane that may be used by the user equipment of the present disclosure.

The radio protocol architecture may take on various forms depending on the particular application. An example for an HSPA system will now be presented with reference to FIG. 7. FIG. 7 is a conceptual diagram illustrating an example of the radio protocol architecture for the user plane 702 and control plane 704.

Turning to FIG. 7, the radio protocol architecture for the UE, for example, UE 102 of FIG. 1 configured to include false peak pruning function 106 (FIG. 1) for pruning false peaks during slot synchronization at a user equipment (e.g., UE 102) is shown with three layers: Layer 1 (L1), e.g., PHY 706, Layer 2 (L2) 708, e.g., RLC/MAC, and Layer 3 (L3) 716, e.g., RRC. Layer 1 is the lowest layer and implements various physical layer signal processing functions. Layer 1 (L1 layer) is referred to herein as the physical layer 706. Layer 2 (L2 layer) 708 is above the physical layer 706 and is responsible for the link between the UE and Node B over the physical layer 706, for example, RLC/MAC 712/710.

In the user plane, L2 layer 708 includes a media access control (MAC) sublayer 710, a radio link control (RLC) sublayer 712, and a packet data convergence protocol (PDCP) 714 sublayer, which are terminated at the Node B on the network side. Although not shown, the UE may have several upper layers above L2 layer 708 including a network layer (e.g., IP layer) that is terminated at a PDN gateway on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between Node Bs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
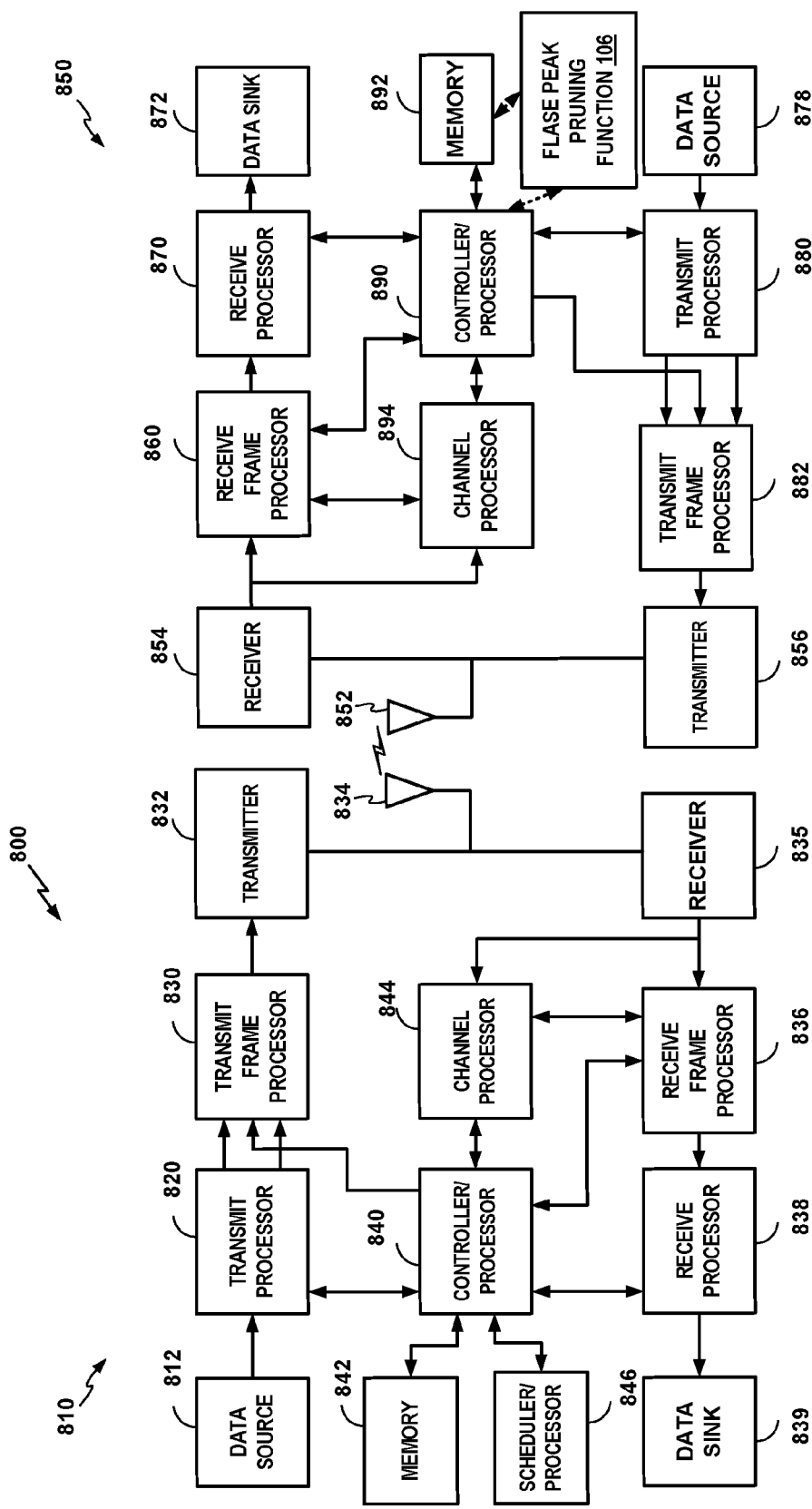
FIG. 8 is a block diagram conceptually illustrating an example of a Node B in communication with a user equipment, which includes a false peak pruning function according to the present disclosure, in a telecommunications system.

FIG. 8 is a block diagram of a Node B 810 in communication with a UE 850, where the Node B 810 may be base station 122 and/or the UE 850 may be the same as or similar to UE 82 of FIG. 1 in that it is configured to include false peak pruning function 106 (FIG. 1) for pruning false peaks during slot synchronization at the UE, in controller/processor 890 and/or memory 892. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 88. More specifically, the receive processor 870 descrambles and de-spreads the symbols, and then determines the most likely signal constellation points transmitted by the Node B 810 based on the modulation scheme. These soft decisions may be based on channel estimates computed by the channel processor 894. The soft decisions are then decoded and de-interleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receive processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operations at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

As used in this application, the terms "function," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

What is claimed is:

1. A method for pruning false peaks during slot synchronization at a user equipment (UE), comprising:
   identifying a plurality of first peaks associated with a primary-synchronization channel (P-SCH) received at the UE, wherein a peak is identified as a first peak based on whether an energy value of the peak satisfies a first threshold value;
   identifying a plurality of second peaks from the plurality of first peaks, wherein a peak of the plurality of first peaks is identified as a second peak based on whether an energy value of the peak of the plurality of first peaks satisfies a second threshold value;
   determining one or more pruning locations and associated energy thresholds for each of the plurality of the second peaks;
   identifying whether a peak of the plurality of first peaks not identified as the second peak is a false peak based on whether the peak is located at one of the one or more pruning locations of the second peak and an associated energy value of the peak does not satisfy the associated energy threshold of the pruning location; and
   discarding the peak identified as the false peak.

2. The method of claim 1, further comprising:
   identifying a peak of the plurality of the second peaks as a true peak when the peak is not located at one of the one or more pruning locations of a corresponding second peak or the energy value of the corresponding second peak satisfies the associated energy threshold of the pruning location.

3. The method of claim 2, further comprising:
   performing frame synchronization at the UE using a secondary synchronization channel (S-SCH) based at least on the identified true peaks.

4. The method of claim 1, wherein the one or more pruning locations are determined based at least on auto-correlation of the P-SCH and cross correlation between the P-SCH and a secondary synchronization channel (S-SCH).

5. The method of claim 4, wherein the one or more pruning locations are identified based at least on chip offset positions relative to a main path.

6. The method of claim 1, wherein the P-SCH is used for acquiring slot timing at the UE.

7. An apparatus for pruning false peaks during slot synchronization at a user equipment (UE), comprising:
means for identifying a plurality of first peaks associated with a primary-synchronization channel (P-SCH) received at the UE, wherein a peak is identified as a first peak based on whether an energy value of the peak satisfies a first threshold value;
means for identifying a plurality of second peaks from the plurality of first peaks, wherein a peak of the plurality of first peaks is identified as a second peak based on whether an energy value of the peak of the plurality of first peaks satisfies a second threshold value;
means for determining one or more pruning locations and associated energy thresholds for each of the plurality of the second peaks;
means for identifying whether a peak of the plurality of first peaks not identified as the second peak is a false peak based on whether the peak is located at one of the one or more pruning locations of the second peak and an associated energy value of the peak does not satisfy the associated energy threshold of the pruning location; and
means for discarding the peak identified as the false peak.

8. The apparatus of claim 7, further comprising:
means for identifying a peak of the plurality of the second peaks as a true peak when the peak is not located at one of the one or more pruning locations of a corresponding second peak or the energy value of the corresponding second peak satisfies the associated energy threshold of the pruning location.

9. The apparatus of claim 8, further comprising:
means for performing frame synchronization at the UE using a secondary synchronization channel (S-SCH) based at least on the identified true peaks.

10. The apparatus of claim 7, wherein the means for determining the one or more pruning locations comprises means for determining based at least on auto-correlation of the P-SCH and cross correlation between the P-SCH and a secondary synchronization channel (S-SCH).

11. The apparatus of claim 10, wherein the means for determining the one or more pruning locations comprises means for determining based at least on chip offset positions relative to a main path.

12. The apparatus of claim 7, wherein the P-SCH is used for acquiring slot timing at the UE.

13. A non-transitory computer readable medium storing computer executable code for pruning false peaks during slot synchronization at a user equipment (UE), comprising:
code for identifying a plurality of first peaks associated with a primary-synchronization channel (P-SCH) received at the UE, wherein a peak is identified as a first peak based on whether an energy value of the peak satisfies a first threshold value;
code for identifying a plurality of second peaks from the plurality of first peaks, wherein a peak of the plurality of first peaks is identified as a second peak based on whether an energy value of the peak of the plurality of first peaks satisfies a second threshold value;
code for determining one or more pruning locations and associated energy thresholds for each of the plurality of the second peaks;
code for identifying whether a peak of the plurality of first peaks not identified as the second peak is a false peak based on whether the peak is located at one of the one or more pruning locations of the second peak and an associated energy value of the peak does not satisfy the associated energy threshold of the pruning location; and
code for discarding the peak identified as the false peak.

14. The computer readable medium of claim 13, further comprising:
code for identifying a peak of the plurality of the second peaks as a true peak when the peak is not located at one of the one or more pruning locations of a corresponding second peak or the energy value of the corresponding second peak satisfies the associated energy threshold of the pruning location.

15. The computer readable medium of claim 14, further comprising:
code for performing frame synchronization at the UE using a secondary synchronization channel (S-SCH) based at least on the identified true peaks.

16. The computer readable medium of claim 13, wherein the code for determining one or more pruning locations comprises code for determining based at least on auto-correlation of the P-SCH and cross correlation between the P-SCH and a secondary synchronization channel (S-SCH).

17. The computer readable medium of claim 16, wherein the code for determining one or more pruning locations comprises code for determining based at least on chip offset positions relative to a main path.

18. The computer readable medium of claim 13, wherein the P-SCH is used for acquiring slot timing at the UE.

19. An apparatus for pruning false peaks during slot synchronization, comprising:
a memory configured to store data; and
one or more processors communicatively coupled with the memory, wherein the one or more processors and the memory are configured to:
identify a plurality of first peaks associated with a primary-synchronization channel (P-SCH) received at a user equipment (UE), wherein a peak is identified as a first peak based on whether an energy value of the peak satisfies a first threshold value;
identify a plurality of second peaks from the plurality of first peaks, wherein a peak of the plurality of first peaks is identified as a second peak based on whether an energy value of the peak of the plurality of first peaks satisfies a second threshold value;
determine one or more pruning locations and associated energy thresholds for each of the plurality of the second peaks;
identify whether a peak of the plurality of first peaks not identified as the second peak is a false peak based on whether the peak is located at one of the one or more pruning locations of the second peak and an associated energy value of the peak does not satisfy the associated energy threshold of the pruning location; and
discard the peak identified as the false peak.

20. The apparatus of claim 19, wherein the one or more processors and the memory are further configured to:
identify a peak of the plurality of the second peaks as a true peak when the peak is not located at one of the one or more pruning locations of a corresponding second peak or the energy value of the corresponding second peak satisfies the associated energy threshold of the pruning location.

21. The apparatus of claim 20, wherein the one or more processors and the memory are further configured to:
perform frame synchronization at the UE using a secondary synchronization channel (S-SCH) based at least on the identified true peaks.

22. The apparatus of claim 19, wherein the one or more processors and the memory are further configured to determine based at least on auto-correlation of the P-SCH and cross correlation between the P-SCH and a secondary synchronization channel (S-SCH).

23. The apparatus of claim 22, wherein the one or more processors and the memory are further configured to determine based at least on chip offset positions relative to a main path.

24. The apparatus of claim 19, wherein the one or more processors and the memory are further configured to use the P-SCH for acquiring slot timing at the UE.

* * * * *